United States Patent [19]

Kifune et al.

[11] Patent Number: 4,737,542

[45] Date of Patent: Apr. 12, 1988

[54] VULCANIZING COMPOSITION

[75] Inventors: Tatsuo Kifune; Takeharu Ito, both of Yamaguchi, Japan

[73] Assignee: Sanshin Kagaku Kogyo Co., Ltd., Yamaguchi, Japan

[21] Appl. No.: 927,956

[22] Filed: Nov. 7, 1986

Related U.S. Application Data

[62] Division of Ser. No. 752,524, Jul. 8, 1985, abandoned.

[30] Foreign Application Priority Data

Jul. 7, 1984 [JP] Japan .................................. 59-142056

[51] Int. Cl.$^4$ .................................................. C08K 3/06
[52] U.S. Cl. .................................. 524/571; 524/575.5; 524/742
[58] Field of Search ................. 525/354; 524/742, 571, 524/575.5

[56] References Cited

U.S. PATENT DOCUMENTS

| | | | |
|---|---|---|---|
| 3,012,985 | 12/1961 | Zakheim | 524/575 |
| 3,012,998 | 12/1961 | Zakheim et al. | 524/62 |
| 3,259,602 | 7/1966 | Hoel | 524/484 |
| 3,297,625 | 1/1967 | Regenstein, Jr. | 524/474 |
| 3,706,708 | 12/1972 | Kearnan et al. | 525/346 |
| 3,879,323 | 4/1975 | Van Der Loos | 524/62 |
| 4,001,167 | 1/1977 | Tungseth | 524/484 |
| 4,032,469 | 6/1977 | Bartzsch | 252/182 |
| 4,435,477 | 3/1984 | Davis | 428/462 |
| 4,503,176 | 3/1985 | Barlow | 524/62 |

FOREIGN PATENT DOCUMENTS

| | | |
|---|---|---|
| 1046392 | 10/1966 | United Kingdom . |
| 1067041 | 4/1967 | United Kingdom . |
| 1101925 | 2/1968 | United Kingdom . |

*Primary Examiner*—Christopher Henderson
*Attorney, Agent, or Firm*—Sandler & Greenblum

[57] ABSTRACT

An improved vulcanizing composition including sulfur and a dispersing agent which is useful for improving the dispersibility of sulphur used in vulcanizing rubber including an effective amount of rubber in combination with a rubber processing oil. A method for preparation of the improved vulcanizing composition includes combining a rubber processing oil and an effective amount of rubber to produce a dispersing agent containing about 0.1–30% rubber by total weight of the dispersing agent, and mixing the dispersing agent and sulphur, optionally in the presence of a solvent which is subsequently removed, to produce an improved vulcanizing compound.

7 Claims, No Drawings

VULCANIZING COMPOSITION

This is a division of application Ser. No. 752,524 filed July 8, 1985, now abandoned.

BACKGROUND OF THE INVENTION

1. Field of the Invention

The present invention is directed to the use of an insoluble sulphur as a vulcanizing agent for rubber. In particular, insoluble sulphur is used as a vulcanizing agent for rubber products requiring an adhering step, transparent rubbers prone to scorching, colored rubber products, and the like.

2. Discussion of Background and Material Information

The term "insoluble sulphur" used herein refers to polymerized sulphur which is insoluble in carbon disulfide. Although conventional insoluble sulphur normally contains approximately 10% of soluble sulphur, it is referred herein simply as insoluble sulphur.

Due to its polymerized structure, the insoluble sulphur should be dispersed uniformly in rubber when insoluble sulphur is used.

Conventionally, insoluble sulphur is used in a form of fine grain which is atomized and tends to become lost as dust during use. Further, since the fine grain is likely to be charged or electrified due to friction between grains, it might cause a powder dust explosion. Thus, the use of fine grain sulphur causes problems concerning processing, pollution and be like. Moreover, since the insoluble sulphur is not particularly fluid, it does not exhibit good processing, handling, shipping and storage characteristics.

In order to prevent insoluble sulphur from being dusted, and from being charged, it has been proposed to add rubber processing oil to the sulphur. The proposed idea, however, is unsatisfactory because the insoluble sulphur does not disperse well into rubber. In an attempt to improve the physical property of the sulphur, in particular its dispersing ability into rubber, various other proposals have been made none of which, however, have met with much success.

For example, the Japanese Unexamined Patent Publication No. 49-93294 is directed to granules obtained by addition of oil consisting of processing oil and surfactant to insoluble sulphur with a view to improve the dispersion of the sulphur into rubber. U.S. Pat. No. 3,706,708 discloses adding ethylene glycol ether, a nonionic activator, to insoluble sulphur so as to accelerate the sulphur dispersion. Both of the proposals succeeded somewhat in improving the sulphur dispersion into rubber but they are still unsatisfactory in that the use of the activator is expensive and because the sulphur itself does not disperse to its full extent.

SUMMARY OF THE INVENTION

One of the objects of the invention is to provide an improved rubber dispersive agent which eliminates the drawbacks of the prior art.

Another object of the invention is to provide a nonexpensive rubber dispersive agent which does not affect the physical property of the vulcanized insoluble rubber, and which improves the sulphur dispersing property.

Still another object of the invention is to provide a rubber dispersive agent which improves the fluidity and stability of the insoluble sulphur itself.

A further object of the invention is to provide a novel process for producing an improved rubber dispersive agent.

In order to achieve the objects of the invention, a rubber dispersive agent is provided in accordance with the present invention which includes commercially available 0.1–30% by weight of rubber-processing oil into which rubber is dissolved and is used such that 0.5–30% by total weight of said oil-rubber composition is added to insoluble sulphur.

The rubber dispersive agent product of the present invention is prepared, according to the process of the present invention, by mixing sulphur with a composition consisting of rubber and rubber processing oil, optionally with organic solvent, follow by removing organic solvent if necessary. Rubber may be mixed with insoluble sulphur in the state that the rubber is dissolve in rubber processing oil and/or organic solvent, so that they may be homogenous. Subsequently, in the mixing step, further additives may be included although additional time is required to form an homogenous mixture in the event additives are mixed.

The rubber processing oil and rubber to be used are both conventionally used in the rubber processing field and cause no deleterious effect on the physical property of the vulcanized rubber. It is surprising and unexpected that the rubber dispersive property is improved by treating the insoluble sulphur only with conventional rubber processing oil, rubber and optionally organic solvent, and that the physical property, particularly the fluidity and stability of the insoluble sulphur itself is improved. The advantage of the present invention resides in this point.

The complete principle underlying the technical function of the rubber dispersive agent according to the invention is not completely understood. It is thought that the composition, however, rubber processing oil and of rubber, forms an oil affinity micelle for insoluble sulphur, which contributes to improve the physical property, such as fluidity and stability of the insoluble sulphur itself. Further, the product obtained by the use of the agent prepared in accordance with the process of the invention is less adhesive at the time when it is weighted and transported than commercially available insoluble sulphur, and is less secondary-agglomerated and consequently it is less liable to hardening. Accordingly the product obtained is excellent in fluidity and in preservation-stability. This is also because an oil affinity micelle is formed at the surface of the insoluble sulphur, which decreases friction and reduces static electricity.

As will be clear from examples below, it is essential that the surface of the insoluble sulphur is previously treated with rubber processing oil and rubber. No particular effect, such as improvement of dispersing property, however, is obtained if the sulphur is added with the rubber processing oil and rubber at the time of vulcanization.

DETAILED DESCRIPTION AND PREFERRED EMBODIMENTS

Process for Preparing Coating oils

Rubber is added to rubber processing oil such as naphtrenes, paraffins, aromatics, in an amount of 0.1–30% by total weight with stirring. After the mixture is heated to about 80 C. as required with stirring until the rubber is completely dissolved, it is cooled to ordinary room temperature to obtain a coating oil composition. In the case where organic solvent is used in place of the processing oil, the resultant composition is referred to herein as a coating solvent composition.

Table 1 below shows examples of coating oil compositions.

TABLE 1

| No. | Rubber | Oil amount (g) | Rubber Amount (g) | Oil Used |
|---|---|---|---|---|
| 1. | Natural rubber | 999 | 1 | Naphthenes |
| 2. | Styrene butadiene rubber | 995 | 5 | Aromatics |
| 3. | Butadiene rubber | 800 | 200 | Naphthenes |
| 4. | Isoprene rubber | 970 | 30 | Naphthenes |
| 5. | Isobutylene isoprene rubber | 900 | 100 | Paraffins |
| 6. | Nitrile butadiene | 800 | 200 | Aromatics |
| 7. | Ethylene propylene | 700 | 300 | Paraffins |
| 8. | Ethylene propylene diene rubber | 700 | 300 | Paraffins |

EXAMPLE 1

995 g of powdered insoluble sulphur (96% purity) was introduced into a stainless ribbon blender of 2 l volume and stirred. Then 5 g of the coating oil composition of type No. 1 in table 1 was dropped into the sulphur and the mixture was stirred for an additional 60 minutes to coat the sulphur with the composition. The resultant insoluble sulphur composition weighed 999.8 g. and had a sulphur content of 95% by total weight of which 95.5% was insoluble sulphur.

EXAMPLE 2

900 g of powdered insoluble sulphur (97% purity) and 100 g of No. 2 (Table 1) coating oil composition were mixed in a way similar to Example 1 to obtain 997 g of an insoluble sulphur composition being 90% by total weight sulphur of which 86.4% was insoluble sulphur.

EXAMPLE 3

850 g of powdered insoluble sulphur (97% purity) and 150 g No. 3 coating oil composition were used as in Example 1. The insoluble sulphur composition which was obtained weighed 994 g and had a sulphur content of 85% by total weight of which insoluble sulphur was 81.6%.

Example 4

800 g of powdered insoluble sulphur (98% purity) and 200 g of No. 4 coating oil composition were processed as Example 1. The resultant insoluble sulphur composition weighed 995 g and contained 80% by total weight sulphur of which and insoluble sulphur was 76.8%,

EXAMPLE 5

750 g of powdered insoluble sulphur (98% purity) and 250 g of No. 6 oil composition were used in a way similar to Example 1 to obtain 986 g of an insoluble 75% by total weight sulphur composition containing sulfur of which 72% was insoluble sulphur.

EXAMPLE 6

700 g of powdered insoluble sulphur (97% purity) and 300 g of No. 8 oil composition were processed in Example 1 to result with 993 g of an insoluble sulphur composition containing 70% by total weight of sulphur of which 67.9% was insoluble sulphur.

EXAMPLE 7

850 g of powdered insoluble sulphur (97% purity) was stirred in a mixed liquid containing 150 g of No. 7 coating oil composition and 200 g of carbon disulfide, in a manner similar to Example 1. After organic solvent is removed, 984 g of an insoluble sulphur composition containing 83% by total weight of insoluble sulphur was obtained.

EXAMPLE 8

900 g of powdered insoluble sulphur (98% purity) was stirred in a mixture of 100 g of a coating solvent composition consisting of 5 w/t % styrene butadiene, 95 w/t% rubber and toluene, and 95 g of aromatic processing oil, in a manner as Example 1. After organic solvent was removed, 998.7 g of an insoluble sulphur composition containing 87.5% by total weight insoluble sulphur was obtained.

EXAMPLE 9

960 g of wet, cake-like insoluble sulphur containing 22% of carbon sulfide (being in midway to normal insoluble sulphur), was introduced into a ribbon blender and stirred. 360 g of a coating solvent composition containing 14.3 w/t % ethylene propylene rubber and 85.7% w/t % carbon sulfide was dropped onto the sulphur, stirred and homogenized. In addition, 200 g of paraffin processing oil is introduced, mixed and homogenized so that the sulphur may be coated. After carbon sulfide is removed, 990 g of insoluble sulphur composition containing 74% by total weight of insoluble sulphur was obtained.

EXAMPLE 10

1090 g of wet, cake-like insoluble sulphur as used in Example 9, 180 g of coating solvent composition containing 11.1 w/t % isobutylene isoprene rubber and 88.9 w/t % carbon sulfide, and 130 g of paraffin processing oil were used in a manner similar to Example 9. After the carbon sulfide was removed, 970 g of insoluble sulphur containing 83.2% by total weight insoluble sulphur was obtained.

EXAMPLE 11

1200 g of wet, cake-like insoluble sulphur as described in Example 9 was introduced into a ribbon blender. While being stirred, the sulphur was added to 70 g of a coating oil composition containing 95 w/t % naphthene oil and 5 w/t % natural rubber. After the mixture is homogenized and carbon sulfide is removed, 1001 g of insoluble sulphur composition containing insoluble sulphur 92%, was obtained.

EXAMPLE 12

1100 g of wet, cake-like insoluble sulphur as described in Example 9 was introduced into a ribbon blender. While being stirred, the sulphur was added to 150 g of a coating oil composition containing 80 w/t % naphthene oil and 20 w/t % natural rubber, and 300 g of xylene, simultaneously. After being mixed, homogenized carbon sulfide was removed to result with 1003 g of insoluble sulphur composition containing 85.1% by total weight sulphur.

Control 1

800 g of powdered insoluble sulphur and 200 g of naphthene oil were treated as stated in Example 1 so as to result with 990 g of insoluble sulphur coated by oil only.

Control 2

1100 g of wet, cake-like insoluble sulphur as described in Example 9, 150 g of aromatic oil and 300 g of toluene were simultaneously introduced into a ribbon blender and mixed. After organic solvent was removed, 1002 g of insoluble sulphur coated by oil only was obtained.

Control 3

100 g of commercially available polybutadiene rubber was wound around a roll maintained at 50±5 C. to which 4 g of insoluble sulphur and 1 g of naphthene oil were slowly added for 1 minute, cut for 2 minutes, and tightly milled five times to produce a sheet.

Results of Rubber Dispersion 100 g of commercially available polybutadiene rubber was wound around a roll maintained at 50±5 C. to which 5 g of insoluble sulphur prepared as described in Controls 1 and 2, was slowly added for 1 minute, cut for 2 minutes, and tightly milled five times to obtain sheet. A number of dispersed inferior particles were counted. The results are shown in Table 2.

TABLE 2

| Example or Sample No. | No. of inferiorly dispersed particle per 1 cm$^2$ |
| --- | --- |
| Example 1 | 3 |
| Example 2 | 0–1 |
| Example 3 | None |
| Example 4 | None |
| Example 5 | 1–2 |
| Example 6 | 2 |
| Example 7 | 0–1 |
| Example 8 | 0–1 |
| Example 9 | 0–1 |
| Example 10 | None |

TABLE 2-continued

| Example or Sample No. | No. of inferiorly dispersed particle per 1 cm$^2$ |
| --- | --- |
| Example 11 | 1–2 |
| Example 12 | 3 |
| Control 1 | 5–7 |
| Control 2 | 6–8 |
| Control 3 | Many |

From the results shown in table 2, it is clear that the rubber dispersing agent prepared in accordance with the invention remarkably improves the dispersion of insoluble sulphur into rubber.

Although the foregoing invention has been described in some detail by way of examples for purposes of clarity of understanding, it will be obvious that certain changes and modifications may be practiced within the scope of the appended claims.

What is claimed is:

1. An improved vulcanizing composition consisting essentially of sulphur and a dispersing agent comprising a mixture of rubber processing oil and an amount of rubber in the range of about 0.1–30% by total weight of said dispersing agent.

2. The composition according to claim 1, wherein said rubber is a member selected from the group consisting of natural rubber and synthetic rubber.

3. The composition according to claim 2, wherein said rubber is a polybutadiene rubber.

4. The composition according to claim 1, wherein said sulphur is insoluble sulphur.

5. The composition according to claim 4, wherein said dispersing agent is present in an amount within the range of about 0.5–30% by total weight of said composition.

6. The composition according to claim 1, wherein said rubber processing oil is a member selected from the group consisting of naphthenes, paraffins and aromatics.

7. The composition according to claim 1, wherein said rubber processing oil is a mixture of oils including at least one member of the group consisting of naphthenes, paraffins and aromatics.

* * * * *

UNITED STATES PATENT AND TRADEMARK OFFICE
CERTIFICATE OF CORRECTION

PATENT NO. : 4,737,542

DATED : April 12, 1988

INVENTOR(S) : Tasuo KIFUNE et al.

It is certified that error appears in the above-identified patent and that said Letters Patent is hereby corrected as shown below:

At column 1, line 31, change "be" to ---the---.
At column 2, line 17, change "dissolve" to ---dissolved---.

At column 2, line 39, change "improve" to ---improving---.
At column 2, line 40, change "property" to ---properties---.
At column 2, line 40, insert ---,--- after "stability".
At column 2, line 63, change "oil" to ---oils---.
At column 3, line 53, delete "and".
At column 3, line 54, change "," to ---.---.
At column 3, line 65, insert ---as--- after "processed" and before "in".
At column 3, line 66, change "with" to ---in---.
At column 4, line 62, change "with" to ---in---.
At column 5, line 1, change "with" to ---in---.
At column 5, line 33, change "particle" to ---particles---.
At column 6, line 3, change "particle" to ---particles---.

UNITED STATES PATENT AND TRADEMARK OFFICE
CERTIFICATE OF CORRECTION

PATENT NO. : 4,737,542
DATED : April 12, 1988
INVENTOR(S) : Tasuo Kifune et al

It is certified that error appears in the above-identified patent and that said Letters Patent is hereby corrected as shown below:

At column 6, line 3, change "particle" to -- particles --.

Signed and Sealed this

Sixth Day of June, 1989

Attest:

DONALD J. QUIGG

Attesting Officer

Commissioner of Patents and Trademarks